US012689048B2

(12) United States Patent
Braun

(10) Patent No.: US 12,689,048 B2
(45) Date of Patent: Jul. 21, 2026

(54) METHOD FOR PROTECTING COMPONENTS OF A FUEL CELL SYSTEM

(71) Applicant: Robert Bosch GmbH, Stuttgart (DE)

(72) Inventor: Jochen Braun, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 601 days.

(21) Appl. No.: 18/252,586

(22) PCT Filed: Oct. 29, 2021

(86) PCT No.: PCT/EP2021/080169
§ 371 (c)(1),
(2) Date: May 11, 2023

(87) PCT Pub. No.: WO2022/101036
PCT Pub. Date: May 19, 2022

(65) Prior Publication Data
US 2024/0021855 A1      Jan. 18, 2024

(30) Foreign Application Priority Data

Nov. 12, 2020     (DE) .................... 10 2020 214 232.7

(51) Int. Cl.
*H01M 8/04746*      (2016.01)
*H01M 8/04089*      (2016.01)
(Continued)

(52) U.S. Cl.
CPC ... *H01M 8/04753* (2013.01); *H01M 8/04097* (2013.01); *H01M 8/04104* (2013.01);
(Continued)

(58) Field of Classification Search
CPC ......... H01M 8/04097; H01M 8/04104; H01M 8/04111; H01M 8/04231; H01M 8/04395;
(Continued)

(56) References Cited

U.S. PATENT DOCUMENTS

| 2004/0151964 A1 | 8/2004 | Finger et al. |
| 2012/0308908 A1 | 12/2012 | Katano |
| | (Continued) | |

FOREIGN PATENT DOCUMENTS

| DE | 102009048247 A1 * | 4/2011 | ........ H01M 8/04097 |
| DE | 102015118943 A1 | 5/2016 | |
| | (Continued) | | |

OTHER PUBLICATIONS

Machine translation DE102009048247 (Year: 2011).*
Translation of International Search Report for Application No. PCT/EP2021/080169 dated May 6, 2022 (2 pages).

*Primary Examiner* — Victoria H Lynch
(74) *Attorney, Agent, or Firm* — Michael Best & Friedrich LLP

(57) ABSTRACT

The invention relates to a method for protecting components of a fuel cell system (1), the fuel cell system (1) having a fuel cell stack (101), an air path (10), an off-gas line (12), and a fuel line (20) with a recirculation circuit (50), the method comprising the steps of:

monitoring the air path (10) for a fault;
closing a first valve (61) which is situated in the air path (10) and closing a second valve (62) which is situated in the off-gas line (12);
blocking a purge valve (41);
reducing the pressure in the air path (10) upstream of the first valve (61);
if further operation of the fuel cell system (1) is possible:
increasing the pressure in the air path (10) upstream of the first valve (61);
unblocking the purge valve (41);
opening the first valve (61) and the second valve (62);
further operating the fuel cell system (1).

8 Claims, 2 Drawing Sheets

(51) Int. Cl.
　　*H01M 8/04223*　　(2016.01)
　　*H01M 8/04664*　　(2016.01)

(52) U.S. Cl.
　　CPC ... *H01M 8/04231* (2013.01); *H01M 8/04679*
　　　　　(2013.01); *H01M 8/04761* (2013.01)

(58) Field of Classification Search
　　CPC ........... H01M 8/0441; H01M 8/04432; H01M
　　　　　8/04671; H01M 8/04679; H01M 8/04753;
　　　　　H01M 8/04761; H01M 8/04783; Y02E
　　　　　60/50
　　See application file for complete search history.

(56)　　　　　　　　References Cited

U.S. PATENT DOCUMENTS

| | | | |
|---|---|---|---|
| 2015/0311543 A1* | 10/2015 | Matsusue | H01M 8/04753 |
| | | | 429/434 |
| 2018/0069249 A1 | 3/2018 | Yoshioka et al. | |

FOREIGN PATENT DOCUMENTS

| | | | |
|---|---|---|---|
| DE | 102016001463 A1 | 8/2017 | |
| EP | 1885013 A1 | 2/2008 | |
| JP | 2004171842 A | 6/2004 | |
| JP | 2005507136 A | 3/2005 | |
| JP | 2014011090 A | 1/2014 | |
| JP | 2014137887 A | 7/2014 | |
| JP | 2018537617 A | 12/2018 | |
| WO | 2011104762 A1 | 9/2011 | |

* cited by examiner

Fig. 1

METHOD FOR PROTECTING COMPONENTS OF A FUEL CELL SYSTEM

BACKGROUND

The present invention proceeds from a method for protecting components of a fuel cell system.

Hydrogen-based fuel cell systems are considered to be the mobility concept of the future, because they only emit water as off-gas and allow for fast fueling times. Fuel cell systems need air and hydrogen for the chemical reaction within the cells. In order to supply the required amount of energy, the fuel cells arranged within a fuel cell system are interconnected to form so-called fuel cell stacks. Here, the waste heat of the cells is dissipated by means of a cooling loop and released to the environment. The hydrogen required for operating fuel cell systems is generally provided to the systems from high pressure tanks.

SUMMARY

The method according to the invention serves to protect the components of the fuel cell system against damage due to a fault of the fuel cell system and a resulting rapid pressure drop without the undesirable subsequent reactions or damage caused by the initiated measures.

For example, an air path fault can occur due to a leak in the air path, such as caused by a loosened hose connection. Another fault can occur due to the "pumping" of the air compressor.

Upon a detection of the "pump" fault of the air compressor, there can be damage within the air path and the components arranged therein, in particular the air compressor or valves.

For this reason, in case of this fault, the pressure between the air compressor and the fuel cell stack must be rapidly lowered. By closing the first and second valves, it is ensured that the pressure in the blocked region does not change or changes only slightly, so that the pressure difference specification of the fuel cell stack between the three media systems with air, fuel, and coolant is met. Failure to maintain the pressure difference between the media systems can result in damage to the membrane of the fuel cell stack.

Even in the event of a fault due to a leak in the air path, such as through a loosened hose connection, closing the first and second valves can ensure that the pressure in the blocked region does not change or changes only a little.

After the first and second valves are closed and the fuel cell stack is thereby protected against undesirable pressure variation, the pressure in the air path can be reduced.

By lowering the pressure in the air path after a fault, the components in the air path can be protected against damage due to an undesirable high pressure or due to the leak. This is important for a long service life of the components and thus of the entire fuel cell system.

The method for protecting components of a fuel cell system, wherein the fuel cell system has a fuel cell stack, an air path, an off-gas line, and a fuel line with a recirculation circuit, comprises the steps of:

monitoring the air path for a fault;

closing a first valve which is situated in the air path and closing a second valve which is situated in the off-gas line;

blocking a purge valve;

reducing the pressure in the air path upstream of the first valve;

if further operation of the fuel cell system is possible:

increasing the pressure in the air path upstream of the first valve;

unblocking the purge valve;

opening the first valve and the second valve;

further operating the fuel cell system.

In addition to the advantages already mentioned above, blocking the purge valve before reducing the pressure in the air path upstream of the first valve is advantageous, because otherwise the air of the air path and thus also the off-gas line would no longer be sufficient in order to dilute the H2 concentration in the off-gas caused by the purging process. A similar advantage is given in that an unblocking of the purge valve is not possible until the pressure in the air path is increased again, so that a sufficiently large mass flow rate is available in order to dilute the H2 concentration.

It is advantageous to store the pressure in the air path between the first valve and the fuel cell stack at the time of closing of the first valve and the second valve, because this pressure can serve as a reference value when the pressure upstream of the first valve is aligned with the pressure in the blocked region during further operation of the fuel cell system.

Reducing the pressure in the air path by opening a bypass valve so that air can flow from the air path into the off-gas line via a bypass line is advantageous, because it allows for a quick and effective pressure drop.

A further advantage arises when further valves and/or throttle valves and/or a turbine bypass are opened in the air path and in the off-gas line in order to reduce the pressure in the air path.

It is advantageous to reduce or stop the capacity of an air compressor in order to reduce the pressure in the air path, as this will cause less or no more air to be conveyed into the region between the air compressor and the first valve, thus lowering the pressure ratio via the air compressor.

It is advantageous when, prior to opening the first valve and the second valve, the pressure level in the air path upstream of the first valve is adjusted to the pressure level in the blocked region so that there are no pressure surges in the air path upon opening of the first and/or the second valve. Here, an adjustment of the pressure levels can be accomplished by a clocked opening of the first valve and the second valve, such that the different pressure levels are approached in small steps.

To increase the pressure in the air path, depending on the measures initiated thus far, the bypass valve can be advantageously closed and/or the further valves and/or throttle valves and/or the turbine bypass can be closed in the air path and/or in the off-gas line. Alternatively, to increase the pressure in the air path, the capacity of the air compressor can be increased.

In addition or alternatively to the pressure adjustment in the cathode path, the anode pressure can also be adjusted. To comply with the pressure difference specification of the stack (between the anode side and the cathode side), the purge valve can be opened. As a result, the pressure in the recirculation circuit can be adjusted to the pressure level in the blocked region 63 plus an offset. The offset is the pressure difference between the anode side and the cathode side required by the fuel cell stack.

The method according to the invention can be used in particular in fuel cell-powered motor vehicles. However, it is also conceivable to use the method in other fuel cell-powered transportation means, such as cranes, ships, rail vehicles, flying objects, or even in stationary fuel cell-powered objects.

BRIEF DESCRIPTION OF THE DRAWINGS

The figures show:

FIG. 1 a schematic illustration of a fuel cell system according to the invention, and FIG. 2 a flowchart of the individual steps of a method according to the invention.

DETAILED DESCRIPTION

Figure 1:
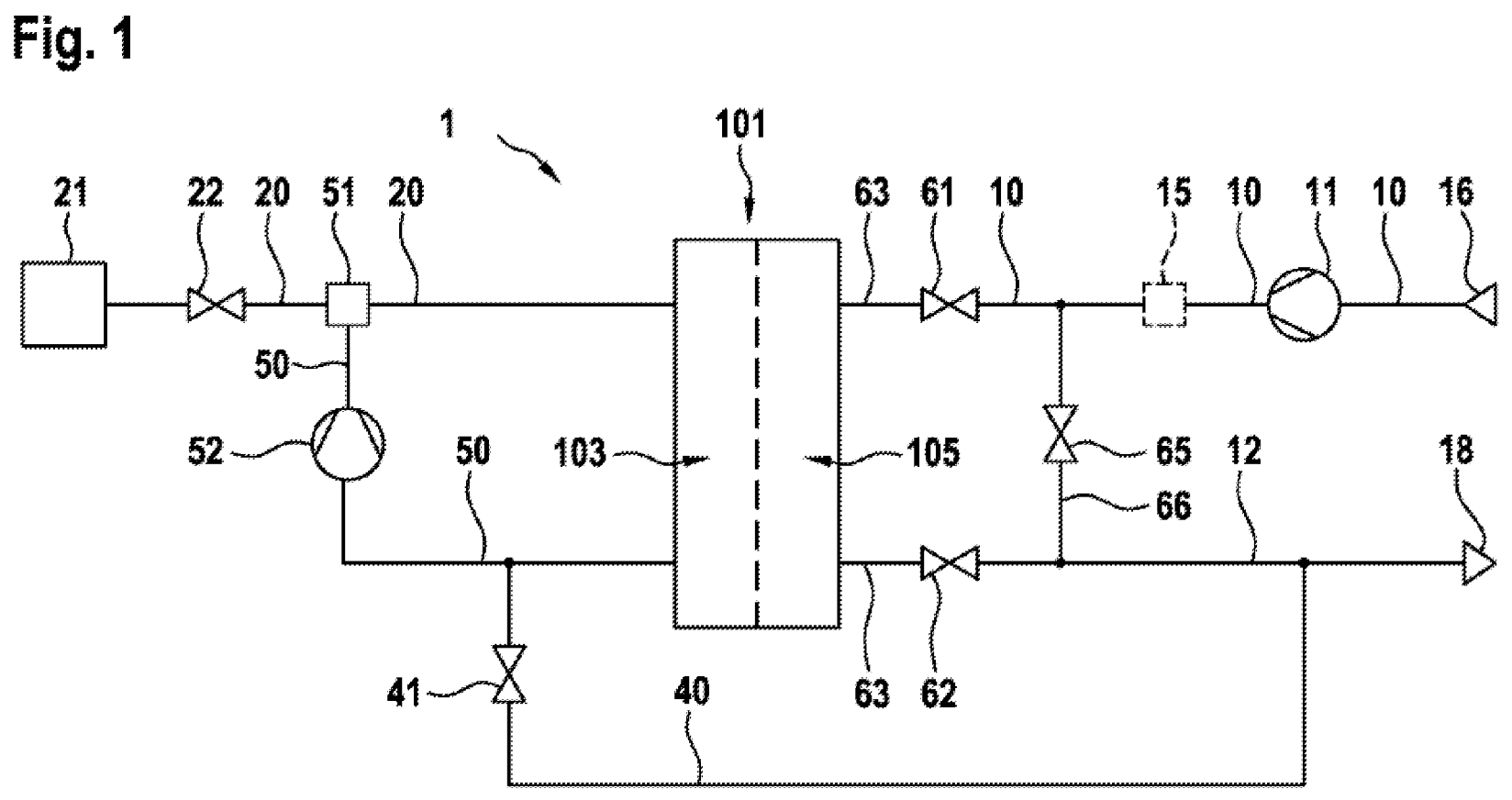
Figure 2:
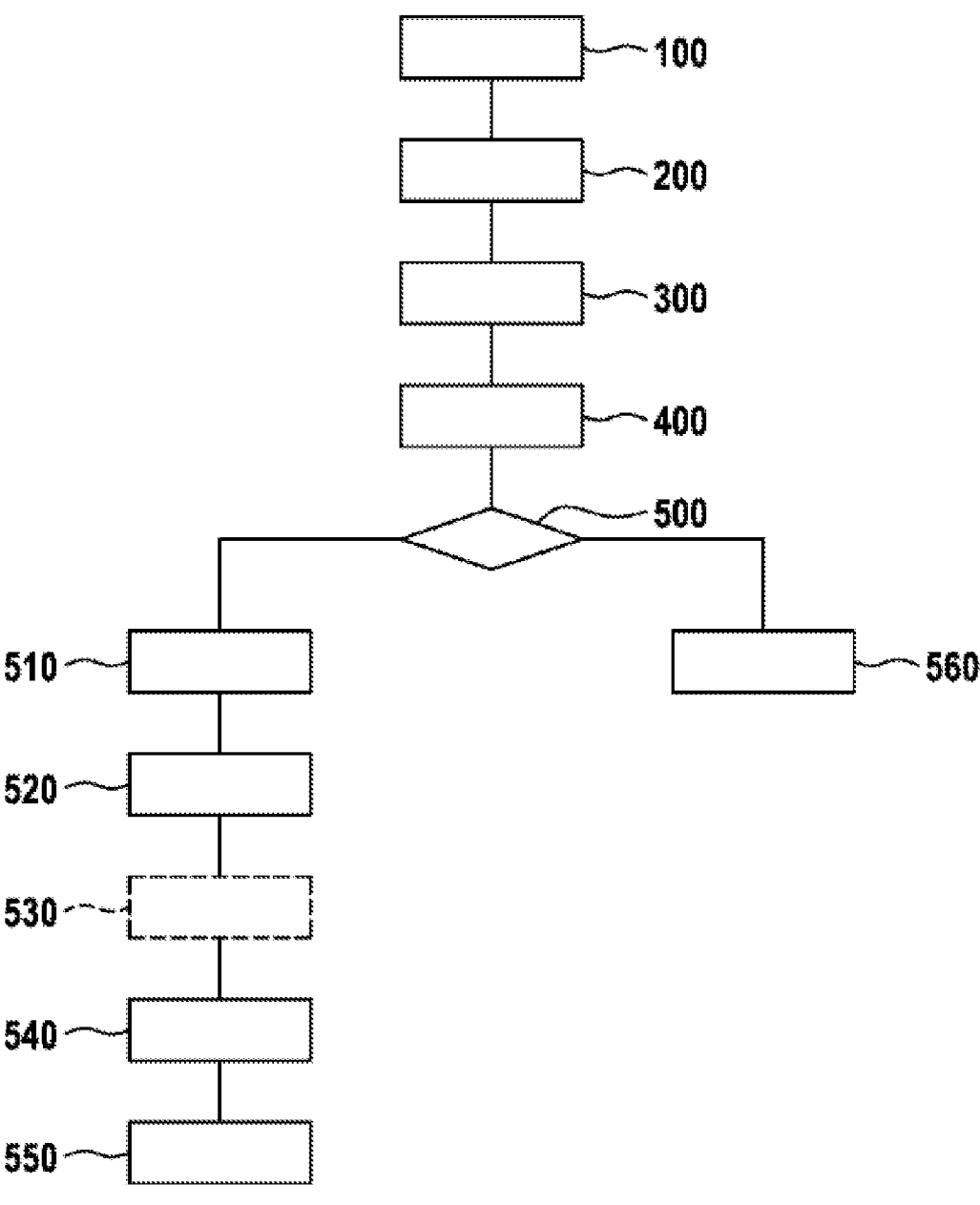

FIG. 1 shows a schematic topology of a fuel cell system 1 according to a first exemplary embodiment of the invention, having at least one fuel cell stack 101. The at least one fuel cell system 1 comprises an air path 10, an off-gas line 12, and a fuel line 20. The at least one fuel cell stack 101 can be used for mobile applications with a high power specification, for example in trucks, or for stationary applications, for example in generators.

The air path 10 serves as an air supply line for supplying air from the environment to a cathode 105 of the fuel cell stack 101 via an inlet 16. Components needed for the operation of the fuel cell stack 101 are arranged in the air path 10. An air compressor 11 and/or compressor 11, which compresses and/or draws in the air in accordance with the respective operating conditions of the fuel cell stack 101, is arranged in the air path 10. A humidifier 15 which enriches the air in the air path 10 with a higher humidity can be arranged downstream of the air compressor 11 and/or compressor 11.

Further components, such as a filter and/or a heat exchanger and/or valves, can be provided in the air path 10 as well. Air containing oxygen is made available to the fuel cell stack 101 via the air path 10.

The fuel cell system 1 also comprises an off-gas line 12 in which water and other components of the air from the air path 10 are transported into the environment via an outflow 18 after passing through the fuel cell stack 101. The off-gas of off-gas line 12 can also contain hydrogen (H2), because portions of the hydrogen can diffuse through the membrane of the fuel cell stack 101 or are conveyed via a purge line 40 into the off-gas line.

The air path 10 is connected to the off-gas line 12 via a bypass line 66. A bypass valve 65 is arranged within the bypass line 66 in order to direct air from the air path 10 past the fuel cell stack 101 to the off-gas line 12.

Between the bypass line 66 and the cathode 105, a first valve 61 is arranged in the air path 10 and a second valve 62 is arranged in the off-gas line 12. By closing the first valve 61 and the second valve 62, the cathode 105 can be held at a fixed pressure level or protected against an undesired pressure drop.

The fuel cell system 1 can moreover comprise a cooling loop configured to cool the fuel cell stack 101. The cooling loop is not shown in FIG. 1, because it is not part of the invention.

A high pressure tank 21 and a shut-off valve 22 are arranged in the inflow of fuel line 20. Additional components can be arranged in the fuel line 20 so as to supply fuel to an anode side 103 of the fuel cell stack 101 as needed.

To always adequately supply the fuel cell stack 101 with fuel, there is a need for an over-stoichiometric metering of fuel via the fuel line 20. The excess fuel, and also certain amounts of water and nitrogen that diffuse through the cell membranes to the anode side, are recirculated in a recirculation circuit 50 and mixed with the metered fuel from the fuel line 20.

Various components, such as a jet pump 51 operated with the metered fuel or a blower 52, can be installed in order to drive the flow in the recirculation circuit 50. A combination of jet pump 51 and blower 52 are possible as well.

Because the amount of water and nitrogen increases more and more over time, the recirculation circuit 50 must be flushed periodically so that the performance of the fuel cell stack 101 does not decrease due to an excessive concentration of nitrogen in the fuel line 20.

A purge line 40 is arranged between the recirculation circuit 50 and the off-gas line 12 so that the gas mixture can flow from the recirculation circuit 50 into the off-gas line 12.

A purge valve 41, which can open and close the connection between the recirculation circuit 50 and the off-gas line, 12 is arranged in the purge line 40. The purge valve 41 is typically opened for a short period of time, so that the gas mixture is fed into the off-gas line 12 via the purge line 40.

FIG. 2 shows a flowchart of the individual steps of a method according to the invention for protecting components in the air path 10 of a fuel cell system 1.

In a method step 100, the air path 10 is monitored for a fault. For example, the fault can be an excessive pressure in the air path 10 between the air compressor 11 and the fuel cell stack 101 or a leak within the air path 10. The excessive pressure can occur, in particular, upon "pumping" of the air compressor 11. The air compressor 11 is in the unstable range of its characteristic map, which occurs in particular when a minimum mass flow rate is fallen below at a certain pressure.

When a fault is detected in the air path 10, in the method step 200, first valve 61 which is situated in the air path 10 and second valve 62 which is situated in off-gas line 12 are closed. Closing the first valve 61 and the second valve 62 creates a blocked region 63 which is situated between the first valve 61 and the second valve 62 and surrounds the cathode side 105 of the fuel cell stack 101.

In a method step 300, the purge valve 41 is blocked, meaning that a specification for opening the purge valve 41 is no longer met.

In a method step 400, the pressure in the air path 10 is reduced upstream of the first valve 61.

A bypass valve 65 can be opened in order to reduce the pressure in the air path 10, so that air can flow from the air path 10 into the off-gas line 12 via a bypass line 66.

Alternatively or additionally, further valves and/or throttle valves and/or a turbine bypass can be opened in the air path 10 and/or in the off-gas line 12 in order to reduce the pressure in the air path 10.

In a further embodiment, in addition to the two options above for reducing the pressure in the air path 10, the capacity of the air compressor 11 can be reduced or stopped.

In a further embodiment, the pressure in the air path 10 between the first valve 61 and the fuel cell stack 101 can be stored at the time of closing the first valve 61 and the second valve 62. This pressure value is particularly important when there is no serious fault and a further operation of the fuel cell system 1 is possible. In this case, the stored pressure value is used as a reference for an adjustment of the pressure in the blocked region 63 and in the air path 10 upstream of the first valve 61.

In a method step 500, it is checked whether a further operation of the fuel cell system 1 is possible.

If continued operation is possible, in a method step 510, the pressure in the air path 10 is increased upstream of the first valve 61.

A further operation is possible if the high pressure has occurred as a result of the "pumping" event of the air compressor 11. In this case, future further operation is easily possible without subsequent adjustment of the system parameters. A further operation is also possible when the air compaction system is only partially operational due to a fault. This can be due to, for example, a fault of the air compressor 11 or due to defective valves.

In this case, the fuel cell system 1 can continue to operate with reduced capacity only to a limited extent. For this purpose, the parameters required for the operation of the fuel cell system 1 must be adjusted. This can be, for example, a shortened opening time of the purge valve 41, because a lower amount of air is available in the off-gas line 12 in order to dilute the H2 concentration. Further details regarding the adjusted parameters are not discussed below, because this is not the topic of the present invention.

In order to increase the pressure in the air path 10, the bypass valve 65 and/or the further valves and/or throttle valves and/or the turbine bypass in the air path 10 and/or the off-gas line 12 can be closed.

In an alternative embodiment, alternatively or additionally, the capacity of the air compressor 11 can be increased in order to increase the pressure in the air path 10.

In a method step 520, the purge valve 41 can be unblocked. This means that if there is a specification of the fuel cell system 1 to purge, this is possible again. By increasing the pressure in the air path 10, the mass flow of air can also be provided in the off-gas line 12 again, which is required for dilution of the H2 concentration.

In an optional method step 530, the pressure level in the blocked region 63 can be adjusted to the pressure level in the air path 10 upstream of the first valve 61.

Additionally or alternatively, to adjust the pressure between the blocked region 63 and the air path 10, the pressure in the recirculation circuit 50 can also be adjusted in order to meet the pressure difference specification of the stack (between the anode side and the cathode side). For this purpose, the pressure level in the recirculation circuit 51 is reduced by opening the purge valve 41. The pressure in the recirculation circuit should be reduced to the pressure in the blocked region 63 plus an offset, wherein the offset is selected such that it does not exceed a pressure of 200 mbar. In exceptional cases, an offset up to a pressure of 400 mbar is possible. However, these values depend largely on the nature and configuration of the fuel cell stack 101.

In a further embodiment, the adjustment of the pressure level can alternatively or additionally be accomplished by a clocked opening of the first valve 61 and the second valve 62. In this case, the pressure in the blocked region 63 is incrementally adjusted until the pressure level in the blocked region 63 and in the air path 10 upstream of the first valve 61 has been aligned such that the first valve 61 and second valve 62 can be opened fully.

However, an adjustment of the pressures between the blocked region 63 and the air path 10 upstream of the first valve 61 is not necessary in every case, for example when the pressure difference between these areas is not too great.

In a method step 540, the first valve 61 and the second valve 62 are opened before a further operation of the fuel cell system 1 is carried out in the method step 550.

If the fuel cell system 1 cannot continue to operate due to a serious fault, then a "bleed down" can be initiated in a method step 560, i.e., by drawing power, the oxygen in the air of the blocked region 63 is largely consumed.

Optionally, in this case, a high pressure level in the blocked region 63 can also be accomplished by briefly opening the first valve 61 and the second valve 62 and the purge valve 41 in parallel. In this way, the pressure is reduced in parallel and incrementally in the blocked region 63 on the cathode side 105 and in the recirculation circuit 50 on the anode side 103 of the fuel cell stack 101. This process can also be performed at greater intervals in order to reduce the H2 concentration in the environment after opening the purge valve 41 by diffusion.

The invention claimed is:

1. A method for protecting components of a fuel cell system (1), the fuel cell system (1) having a fuel cell stack (101), an air path (10), an off-gas line (12), and a fuel line (20) with a recirculation circuit (50), the method comprising the steps of:
   monitoring the air path (10) for a fault;
   closing a first valve (61) which is situated in the air path (10) and closing a second valve (62) which is situated in the off-gas line (12);
   blocking a purge valve (41);
   reducing a pressure in the air path (10) upstream of the first valve (61);
   if further operation of the fuel cell system (1) is possible:
      increasing the pressure in the air path (10) upstream of the first valve (61);
      unblocking the purge valve (41);
      opening the first valve (61) and the second valve (62);
      further operating the fuel cell system (1),
   wherein the pressure in the air path (10) is stored between the first valve (61) and the fuel cell stack (101) at a time of closing the first valve (61) and the second valve (62), and the stored pressure is used as a reference value, and
   wherein prior to opening the first valve (61) and second valve (62), a pressure level of the air path (10) upstream of the first valve (61) is adjusted to a pressure level in a blocked region (63), the blocked region (63) being situated between the first valve (61) and the second valve (62) and surrounding a cathode side (105) of the fuel cell stack (101).

2. The method according to claim 1, wherein a bypass valve (65) is opened in order to reduce the pressure in the air path (10), so that air can flow from the air path (10) into the off-gas line (12) via a bypass line (66).

3. The method according to claim 2, wherein further valves and/or throttle valves and/or a turbine bypass are opened in the air path (10) and/or in the off-gas line (12) in order to reduce the pressure in the air path (10).

4. The method according to claim 1, wherein in order to reduce the pressure in the air path (10), a capacity of an air compressor (11) is reduced or stopped.

5. The method according to claim 1, wherein the adjustment of the pressure level is accomplished by a clocked opening of the first valve (61) and/or the second valve (62).

6. The method according to claim 1, wherein a reduction of a pressure level in the recirculation circuit (50) is accomplished by an opening of the purge valve (41), so that the pressure level in the recirculation circuit (50) is reduced to a pressure level in the blocked region (63) plus an offset.

7. The method according to claim 1, wherein in order to increase the pressure in the air path (10), a bypass valve (65) is closed and/or further valves and/or throttle valves and/or a turbine bypass in the air path (10) and/or an off-gas line (12) are closed.

8. The method according to claim 1,
wherein, in order to increase the pressure in the air path
(10), a capacity of an air compressor (11) is increased.

\* \* \* \* \*